(12) United States Patent
Ifill

(10) Patent No.: US 12,154,065 B2
(45) Date of Patent: *Nov. 26, 2024

(54) SYSTEM AND METHOD FOR PERFORMING PRECISION GUIDED AIR TO GROUND PACKAGE DELIVERY

(71) Applicant: AeroVironment, Inc., Arlington, VA (US)

(72) Inventor: Joel Ifill, Los Angeles, CA (US)

(73) Assignee: AeroVironment, Inc., Arlington, VA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/109,114

(22) Filed: Feb. 13, 2023

(65) Prior Publication Data

US 2023/0206163 A1 Jun. 29, 2023

Related U.S. Application Data

(63) Continuation of application No. 17/220,880, filed on Apr. 1, 2021, now Pat. No. 11,775,916, which is a
(Continued)

(51) Int. Cl.
*G08B 1/08* (2006.01)
*B64D 1/02* (2006.01)
(Continued)

(52) U.S. Cl.
CPC ............. *G06Q 10/083* (2013.01); *B64D 1/02* (2013.01); *G05D 1/101* (2013.01); *G08C 17/02* (2013.01);
(Continued)

(58) Field of Classification Search
CPC .......... G06Q 10/083; B64D 1/02; B64D 1/08; G05D 1/101; G05D 1/105; G08C 17/02;
(Continued)

(56) References Cited

U.S. PATENT DOCUMENTS 2,496,169 A 1/1950 Lochman
2,629,567 A 2/1953 Papadakos
(Continued)

OTHER PUBLICATIONS

Paulos et al., "Cyclic Blade Pitch Control Without a Swashplate for Small Helicopters," Journal of Guidance, Control and Dynamics, vol. 41, No. 3, Mar. 2018, DOI: 10.2514/1.G002683.
(Continued)

*Primary Examiner* — Tai T Nguyen
(74) *Attorney, Agent, or Firm* — Donald J. Lecher; BUTZEL LONG

(57) ABSTRACT

Described is a method of delivery for cargo or goods from an aerial vehicle (mothership) to a designated ground delivery location via the use of a direct air shipping package. For example, an aerial vehicle may be an airplane or helicopter that remains at altitude with a package stowed for deployment. As the mothership travels in the vicinity of the designated location the package flight control computer (flight controller) calculates a preferred travel trajectory based upon the aerodynamic properties of the package and location relative to the designated delivery location such as a small delivery pad located on a patio of a home. When the mothership transits through a calculated release point the package disengages the mothership. As the package descends it may increase accuracy relative to the designated delivery location by altering aerodynamic properties to maintain the preferred travel trajectory and decreasing landing zone size requirements and increasing precision of delivery. To reduce the impact force at landing the designated delivery location and/or the package may contain a net, airbag, parachute or similar device to provide a suitably soft landing suitable for commercial home delivery.

16 Claims, 4 Drawing Sheets

Related U.S. Application Data continuation of application No. 16/881,516, filed on May 22, 2020, now Pat. No. 11,004,027, which is a continuation of application No. 15/782,853, filed on Oct. 13, 2017, now Pat. No. 10,671,960.

(51) Int. Cl.

| | | |
|---|---|---|
| *G05D 1/00* | (2006.01) | |
| *G06Q 10/083* | (2023.01) | |
| *G08C 17/02* | (2006.01) | |
| *B64U 10/13* | (2023.01) | |
| *B64U 101/69* | (2023.01) | |
| *G01C 21/20* | (2006.01) | |

(52) U.S. Cl.
 CPC .......... *B64U 10/13* (2023.01); *B64U 2101/69* (2023.01); *B64U 2201/20* (2023.01); *G01C 21/20* (2013.01)

(58) Field of Classification Search
 CPC ........ B64U 10/10; B64U 10/13; B64U 10/25; B64U 2101/60; B64U 2201/20; G01C 21/20
 USPC ....................................... 340/539.1
 See application file for complete search history.

(56) References Cited

U.S. PATENT DOCUMENTS

| | | |
|---|---|---|
| 3,484,174 A | 12/1969 | McCoubrey |
| 4,047,838 A | 9/1977 | Ferris |
| 5,544,844 A | 8/1996 | Groen |
| 6,481,666 B2 | 11/2002 | Frucht |
| 8,237,096 B1 | 8/2012 | Alexander |
| 9,061,764 B2 | 6/2015 | Riley |
| 9,550,567 B1 | 1/2017 | Erdozain, Jr. |
| 9,567,081 B1 | 2/2017 | Beckman |
| 9,688,404 B1 | 6/2017 | Buchmueller |
| 10,395,544 B1 | 8/2019 | Harris |
| 11,117,666 B2 | 9/2021 | Groen |
| 2007/0029439 A1* | 2/2007 | Merems ............ B64D 1/02 244/7 R |
| 2010/0012774 A1 | 1/2010 | Fanucci |
| 2010/0065288 A1 | 3/2010 | Akcasu |
| 2011/0139928 A1* | 6/2011 | Morris ............ B64U 10/11 244/3 |
| 2014/0231593 A1* | 8/2014 | Karem ............ B64C 1/0009 244/45 R |
| 2015/0284080 A1 | 10/2015 | Facciano |
| 2017/0001724 A1 | 1/2017 | Yates |
| 2017/0084889 A1 | 3/2017 | Miller, Jr. |
| 2018/0079530 A1 | 3/2018 | Wyrobek |
| 2018/0086454 A1 | 3/2018 | Cook |
| 2018/0312252 A1 | 11/2018 | Yates |

OTHER PUBLICATIONS

Shen et al., "Performance of Swashplateless Ultralight Helicopter Rotor with Trailing-Edge Flaps for Primary Flight Control," American Helicopter Society 59th Annual Forum, Phoenix, Arizona, May 6-8, 2003.

Paulos et al., "Cyclic Blade Pitch Control Without a Swashplate for Small Helicopters," Journal of Guidance, Control and Dynamics, ARC, DOI: 10.2514/1.G002683.

* cited by examiner

SYSTEM AND METHOD FOR PERFORMING PRECISION GUIDED AIR TO GROUND PACKAGE DELIVERY

This application is a continuation application from U.S. Application Ser. No. 17/220,880, filed on Apr. 1, 2021 which issued as U.S. Pat. No. 11,775,916 on Oct. 3, 2023, which is a continuation application of U.S. Application Ser. No. 16/881,516 filed on May 22, 2020 which issued as U.S. Pat. No. 11,004,027 on May 11, 2021, which is a continuation application of U.S. application Ser. No. 15/782,853 filed on Oct. 13, 2017 which issued as U.S. Pat. No. 10,671,960 on Jun. 2, 2020.

FIELD OF THE INVENTION

The present invention relates generally to the air delivery of goods from an airplane or helicopter, or other aerial vehicle, to a ground location by means of an autonomously guided package. Specifically, the present invention relates to a system and method for a guided aerial delivery package to provide high accuracy package deliveries regardless of external atmospheric or ground conditions. Depending on the fragility of the cargo, the autonomously guided package may be directed to land on pre-placed landing gear.

BACKGROUND OF THE INVENTION

Airdrop systems have been used for many decades to perform delivery from airplanes. In its simplest form a package is dropped from a moving airplane such that forward momentum carries the package towards the intended ground location. This simple solution has long been used to provide humanitarian aid in areas plagued by famine, natural disasters or war.

Alternatively, some slightly more advanced systems make use of parachutes, airfoils, or gliders or the like. Those devices reduce landing impact forces and allow for "soft landings" in order to protect the dropped cargo. Still more recent configurations include electronic flight controllers that may be used to calculate or predict the flight path of a parachute or glider in order to increase precision of the flight path or to provide feedback and control of flight surfaces to steer the package towards the designated landing location.

Air drops have need to deliver goods as close as possible to the end user in order to reduce secondary transit modes such as truck or hand delivery, and may take place in congested locations where buildings, persons or vehicles may be present in the vicinity of air drop operations. Therefore, it is critical that air dropped packages land within a designed landing sites and do not accidentally hit uninvolved structures or persons. Landing zones must therefore be large enough to account for the inherent inaccuracy of parachute or glider approaches, and clear of tall obstructions on approach path.

Conventional air drop systems today attempt to address the need for delivery accuracy through the use of parachute or parafoil structures with an underslung load commonly consisting of a pallet, box, or bag.

The main drawback with parachute structures and other comparable structures used in the art today is that such devices are not able to provide sufficient guidance or control in all weather conditions such as high wind. Accurate landings cannot be guaranteed in such adverse conditions. In addition to landing inaccuracy, parachute and comparable structures are fragile and can be damaged in adverse conditions. For example, a controllable parachute with a low forward airspeed is also subject to collapse or loss of lift from a tailwind.

Another drawback to existing systems in the art is that parachute or comparable systems require large surface area chutes relative to the package size. The result is that the parachute or similar device may become entangled in trees, power lines, light poles or other ground obstructions near the landing location.

Yet another drawback is that parachutes are designed for a specific wing loading range and thus may only operate in a narrow performance window for minimum and maximum payload capacity. This limitation requires the use of multiple parachute sizes or ballast weights in order to cover a broad range of package weights.

In addition, parachute performance characteristics also require the use of secondary systems or multi parachute deployments in order to operate at the cruising speed and altitudes common to commercial cargo aircraft. The reason being that parachutes are designed for a target wing loading and cannot adapt to a wide range of load capacities while maintaining acceptable performance. These problems with parachute and parafoil performance increase the weight of the deployed system overall, and moreover decrease accuracy. The result is also increased cost and complexity. Moreover, the inherent inaccuracy and inability for controlled parachute systems to reliably land in all weather conditions requires the use of large landing zones generally relegated to fields of several acres or larger and to take place away from structures, or ground personnel that may be inadvertently struck by landing parachutes or packages.

Alternatively, powered or unpowered gliders may also be used to deliver cargo airdropped from airplanes. Similar to parafoils, gliders employ aerodynamic lift in order to reduce vertical descent rate and control surfaces to increase precision of landing. However, gliders require a large wingspan in order to maintain a suitable glide ratio generally greater than 10:1, and also require strong materials in order to maintain structural rigidity at launch speeds typical of cargo aircraft.

Conventional airdrop systems moreover have the drawback that they are not suitable for performing routine commercial delivery in developed or urban regions in which a heightened need for precision landing accuracy and flight during adverse weather conditions may exist. In addition, conventional airdrop systems are expensive, inaccurate and complex to integrate into traditional air cargo operations and thus are primarily used to support military operations or relegated for special use cases away from ground activity. The present invention solves these and other problems.

BRIEF SUMMARY OF THE INVENTION

The device and system of the present invention provide an efficient and accurate way to accomplish air to ground shipments in a variety of settings including urban areas. The present invention can be accurately deployed in adverse or extreme weather systems. In addition, the present invention is capable of safely accommodating fragile cargo. For those reasons and others discussed herein, the device of the present invention substantially departs from the conventional concepts and designs know in the prior art. The improvements disclosed in the present invention allow for a low-cost apparatus that provides accurate airdrops suitable for all commercial flight conditions and delivery to all locations.

The deficiencies of the prior art as described previously are substantially overcome by the use of a guided direct air-shipping package in conjunction with a flight controller. According to one aspect of the present invention, a direct air shipping system consists of a direct air-shipping package that encases a payload to provide a vehicle of known aerodynamic properties. Specifically, the aerodynamic shape is designed to be high drag relative to traditional flight vehicles such that forward velocity and terminal velocity are reduced. The intention of the aerodynamic shape is to diminish all foreword airspeed such that the package falls vertically, similar to the trajectory a shuttlecock might take.

The aerodynamic properties of the direct air-shipping package of the present invention may be numerically modeled in a manner that predictively estimates the resulting ground location based upon conditions at time of release from the aerial vehicle or "mother ship."

According to another aspect of the invention, the package that is deployed from the mother ship (the direct air-shipping package, or package), may contain fins, wings or deflectable surfaces to alter flight path sufficient to maintain heading towards the designated ground location. Such surfaces may be folded or stowed before or during launch to increase the packing efficiency of the packages in the mothership.

According to another aspect of the invention a flight controller determines position of the package system using GPS signals and other sensors to determine location, orientation and velocity relative to the designated ground location.

According to another aspect of the invention the flight controller executes the predictive model to calculate in real time an acceptable release window such that the natural trajectory will coincide with the target ground location.

According to another aspect of the invention, after launch, the flight controller continuously monitors the flight path of the package based upon the numerical model. The flight controller may deflect aerodynamic control surfaces such as fins to further reduce error and maintain a trajectory of the package towards the target ground location.

According to another aspect of the invention, the flight controller includes a transceiver, such as a radio modem or cellular modem. During flight, the transceiver is used to transmit position, altitude, orientation or other information regarding the package to a base location. The base location may be located on the ground, in the deploying mothership, or in another location. The information from the flight controller may be used to monitor operation of the system in real-time. Additionally, the transceiver may receive information from the base location. Such information may include manual override control of the system or change in target coordinates, or external sensor information such as atmospheric conditions like ground wind speed.

According to another aspect of the invention, a designated landing location may contain a net, airbag, or low density foam matting or similar system to slow the decent of the package and enable soft landings of the stowed cargo. The designated landing location may also include, lighting, navigation beacons, anemometers or other devices to aid in the delivery and navigation of the package.

According to another aspect of the invention, the nose of the package may be constructed of material configured into an energy absorbing crushable impact zone. This zone may be used to further reduce landing force experienced by the cargo and may provide a suitable soft impact for commercially shipped goods. To further cushion the landing, the nose of the package may also include an inflatable airbag. That airbag could be compact when not in use and would inflate upon impact in order to protect fragile cargo on landing.

DETAILED DESCRIPTION OF THE PRESENT INVENTION

The device of the present invention will now be described with reference to the figures. As disclosed herein, the package system enables the unique capability of delivering goods or cargo to a designated landing zone with several advantages over current airdrop platforms. The present invention possesses numerous advantages over current airdrop systems.

Figure 1:
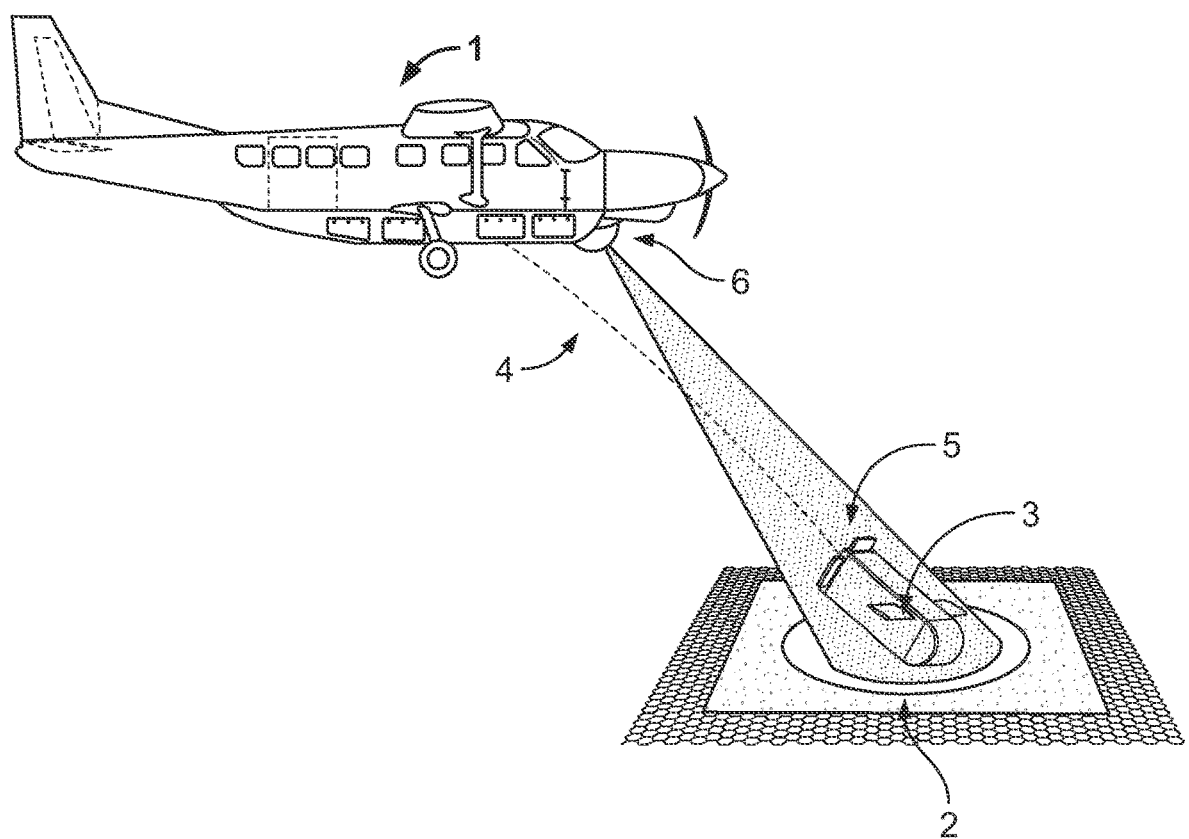
FIG. 1 depicts one embodiment of a mother ship and a package being deployed form that mother ship.

As shown in FIG. 1, the system and method of the present invention possesses the unique capability of delivering cargo to a designated landing zone. In the present invention a mother ship (1) flies in the vicinity of a designated landing zone (2). Mother ship 1 may preferably be a fixed winged manned aircraft. In one embodiment, mother ship (1) may be an airplane. In that embodiment, the airplane may be a cargo plane, a military plane, a personal jet, or other plane. In other embodiments mother ship (1) may be other types of flying vehicles including helicopters or any other manned aerial apparatus. In an alternate embodiment, the package may be launched from autonomous unmanned aerial vehicles. For example, in that embodiment, a large drone could be employed as mother ship (1).

Designated landing site (2) may be any designated area intended to the land package vehicles. The landing site may consist of any area cleared of overhead obstructions such that a clear path from the mother ship to the landing site may be traced. In the preferred embodiment, the landing site may contain a net, foam pit, airbag or similar device to slow the package at deceleration rate, which does not harm the shipped goods or cargo. Ground sensors such as anemometers, GPS base stations, or similar may be used to update the flight controller on conditions in the vicinity of the landing site. This data may be communicated to the mother ship or Flight controller by means of two-way radio modem, cellular tower, Wi-Fi or similar wireless communication technology. Navigation lights, markings or symbols may also be used to visually designate the landing site or create an improvised landing site. As the package vehicle may have high precision to a specific landing point the designated ground location may be much smaller than traditional helipads, runways or other landing locations further enabling more options on suitable landing locations and lower cost in the construction and maintenance of landing zones.

FIG. 1 depicts the package (3) being deployed from mother ship (1). As shown, package (3) maintains a preferred flight trajectory (4) toward the landing zone (2). package 3 maintains flight trajectory (4) by deflecting control surfaces (5). Mother ship (1) includes two-way communication and sensors on a sensor pod (6). The communication devices and sensors on sensor pod (6) may preferably include GPS tracking devices and cameras. Other tracking and communications devices known in the art may alternatively be used.

In one embodiment, mother ship (1) may be a Cessna 206, or other cargo aircraft. Mother ship (1) stows the package during flight operations and travels toward the general vicinity of the designated ground location. The ground location may be programmed into a flight controller on board mother ship (1). That programming may be achieved by uploading GPS coordinates in advance of the flight. Alternatively, the programming may be achieved by identifying a ground location during flight and using Lidar, Cameras, GPS, triangulation or other sensors to determine precise ground location. Navigation towards the ground location may be aided by the flight controller acting as a secondary navigation aid by means of tablet computer or similar display device that may provide directional guidance toward the designated ground location.

Sensor pod (6) may preferably contain a plurality of sensors such as GPS, infrared and/or visual cameras, altimeters, air speed sensors, and laser range finders. Other sensors and aids known in the art may alternatively be used. The devices in sensor pod (6) aid the flight controller in determining location, velocity and atmospheric conditions in relation to the desired ground location. In an alternate embodiment, a base station at the landing site may provide additional telemetry by means of a two-way radio modem or similar communication standard. The sensors are discussed further in connection with FIG. 3.

The flight controller located in mother ship (1) uses the telemetry and sensor information in order to calculate a release trajectory that will result in package (3) landing at the designated landing site (2) with minimal to no external energy or need to modify this natural trajectory. This preferred trajectory and release window may optionally be displayed on the secondary navigation aid (laptop or tablet screen) as a three-dimensional volume, 2D or 3D approach for the pilot to follow in order to reach their designated ground location.

Once the release window has been transited the flight controller signals to a release actuator to drop or launch package (3) on the preferred trajectory beginning the flight phase. In an alternative embodiment, the package may be manually released from mother ship (1). In that embodiment, an operator on board mother ship (1) may open a hatch or other portal. A computing display such as a tablet or other computing device would display a countdown to release, at which time the operator would deploy the package. After release package (3) may fold, inflate, or deploy aerodynamic features such as tail fins, wings or nose section. The purpose of this is to increase packing factor and ease of launch in the as-stowed configuration and to protect control surfaces from harsh conditions during the launch phase. Increasing packing factor allows a larger number of package vehicles to be stowed within a given cargo aircraft volume allowing for increased operational efficiency and lower cost per package compared to fixed wing gliders, multi rotors or parachute-based systems.

Figure 2:
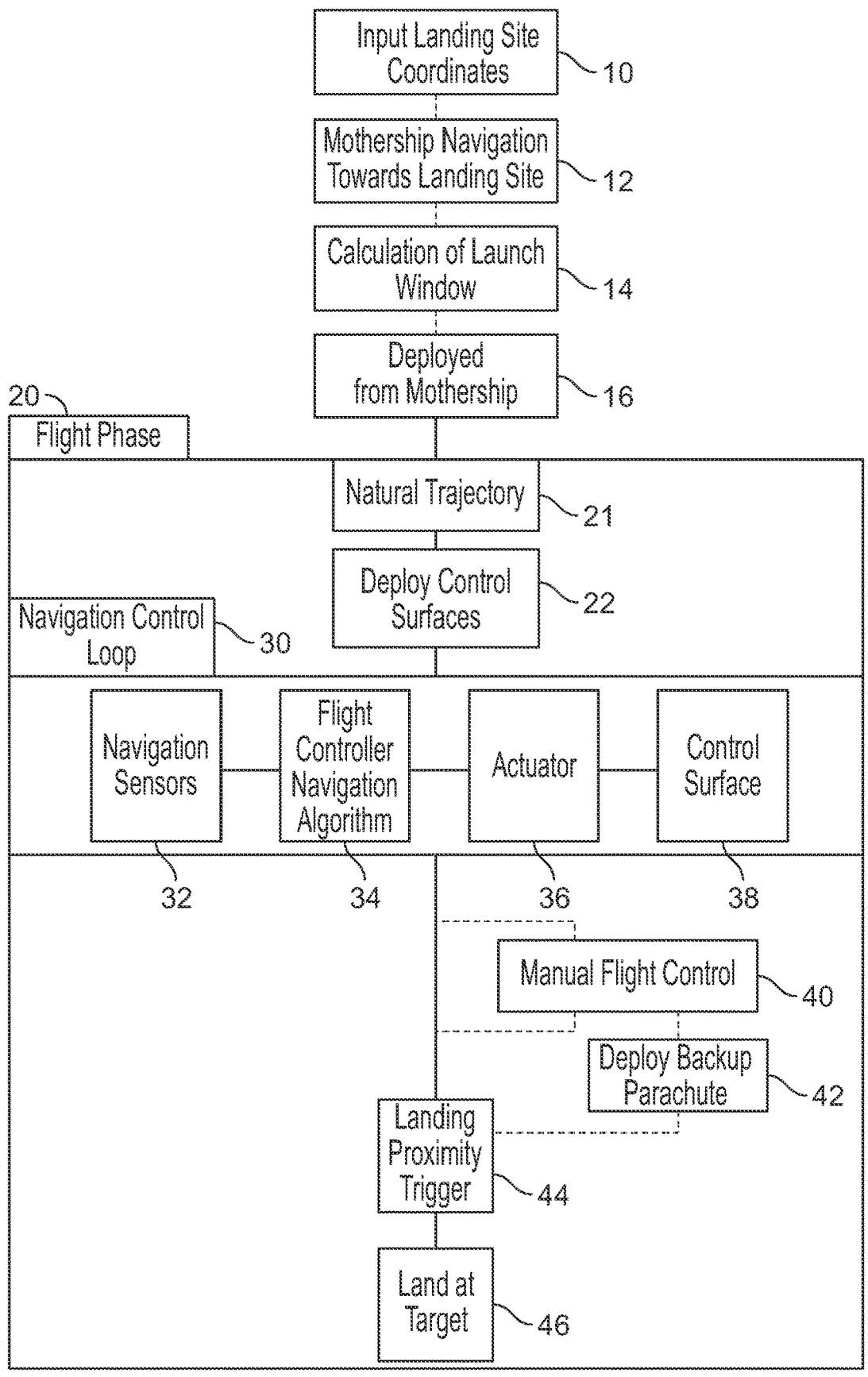
FIG. 2 is a flow chart showing the sequence of deployment operations.

Reference will now be made to FIG. 2 depicting a block diagram of flight operations. As shown in block 10, prior to launch from mother ship (1) ground GPS coordinates are placed into the flight controller memory by computer interface. The ground coordinates may be placed into the flight controller memory prior to or during flight.

As shown in block 12, mother ship (1) is piloted towards the location of the designated landing site (2). The flight controller may optionally output secondary navigation information to a computer interface such as a monitor to aid in navigation to the designated landing site. As shown in block 14, the flight controller continuously calculates a preferred trajectory based upon sensor inputs such as GPS, altimeters, and accelerometers in order to calculate a release window consisting of a bounded volume of space in which the as-released flight trajectory will intercept the designated landing zone. Other equipment known in the art may alternatively be employed.

Block 16 shows that when the release window is reached, the flight controller actuates a release servo or similar mechanism to detach package (3) from mother ship (1). As shown in Block 20, Dash package (3) begins the flight phase of the operation in which the package vehicle is traveling on a ballistic trajectory towards the ground. Package (3) then begins the natural trajectory phase of flight in which the forward momentum and aerodynamic properties impart a trajectory. Control surfaces or the vehicle may be optionally maintained in a stowed configuration until forward air speed or other triggers are met.

As shown in Block 22, in the preferred embodiment package (3) may deploy, wings, fins or other similar structures in order to transit from an aerodynamic or volumetrically efficient configuration to the maneuverable flight form. The deployment may be trigger by the flight controller due to preset altitude limits, or sensor inputs such as air speed or attitude.

As shown in Block 30, the navigation sensors continuously calculate error from the preferred trajectory based upon input data from sensors (32). The input data is interpreted by the flight controller navigation algorithm (34). That algorithm determines the deflection of control surfaces to continually reduce error in the positioning of package (3). The flight controller may then output commands to actuators 36 in order to move control surfaces such as fins or wings 38. Error calculation and correction is then continuously performed until terminated by the flight controller or manual override.

In one embodiment, the operator may manually override navigation and actuate control surfaces by communication via radio modem or other wireless communication devices. Control override may consist of altering the preferred trajectory or GPS coordinates of the designated landing site or by manually manipulating control surfaces.

As shown in Block 42, prior to the time at which package (3) impacts the landing area, landing triggers may be set by crossing an altitude threshold, minimum distance trigger, or similar sensor inputs. The landing trigger may be optionally used to perform deployment of a drogue chute, stowage of wings or control surfaces or orientation of the vehicle into a preferred landing configuration. Package (3) then lands at the designated landing site as shown in Block 46, and ceases flight operations.

Figure 3:
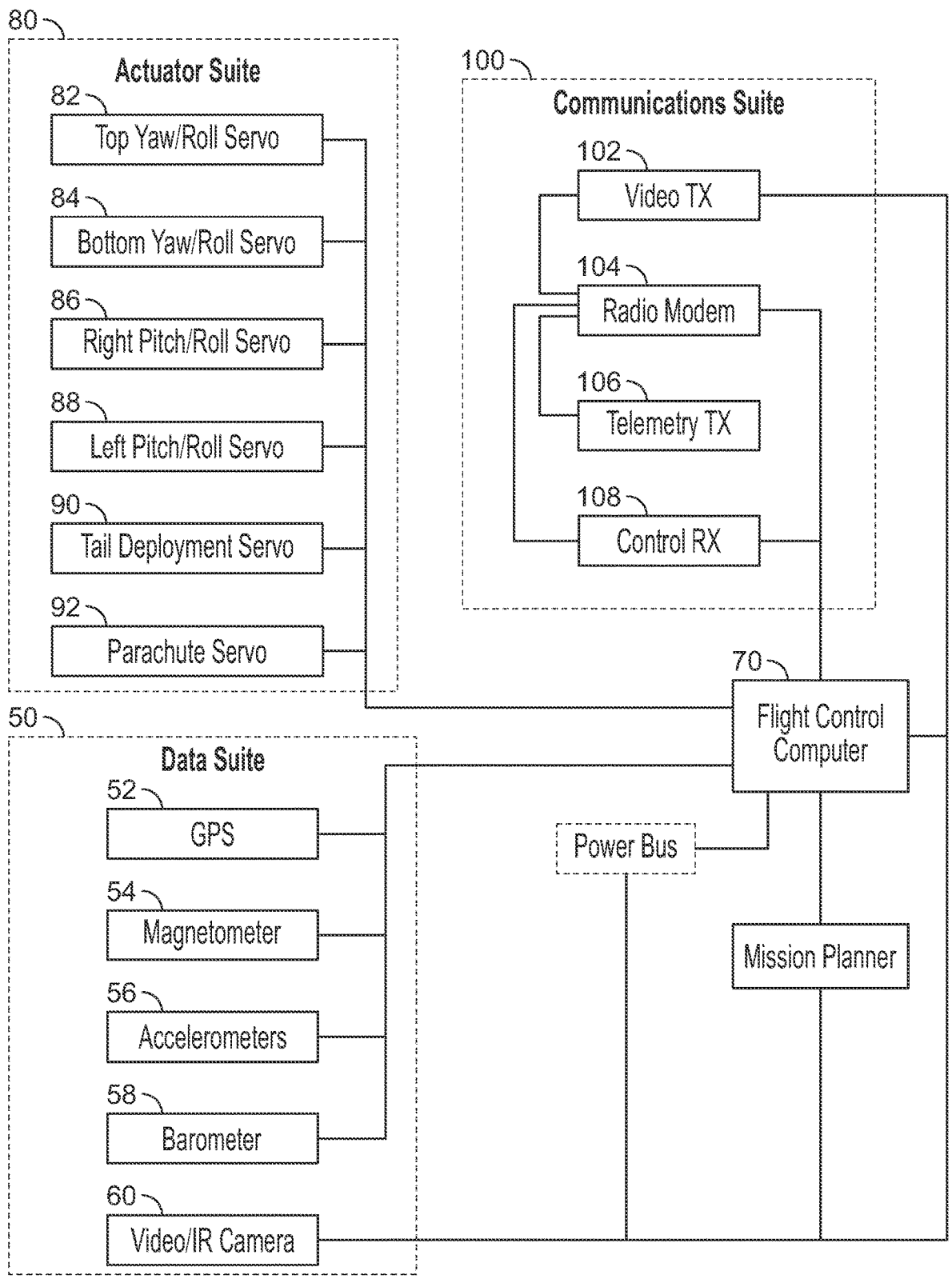
FIG. 3 is a block diagram depicting flight controller functions.

Reference is now made to FIG. 3, which depicts the flight controller functions. As shown in FIG. 3, the package vehicle flight control and telemetry system may preferably be a flight control computer (FCC) (70) consisting of components necessary to provide location, guidance and control of surfaces. That computer allows for an accurate determination of the current location of the mother ship relative to the designated landing location. It further deflects control surfaces to maintain precision on a flight path towards the designated landing location.

A suite of sensors (50) such as GPS (52), Magnetometer (54), 3-axis Accelerometers (56), barometer (58) and Video Cameras (60) gather information sufficient to provide telemetry and information to determine the location, orientation, heading and flight conditions of the package. The sensors may be self-correcting and error rejecting such that the particular sensor providing the highest fidelity is weighted for use within the Flight Controller (70) Navigation algorithm. The FCC (70) processes the measured flight information then commands a suite of actuators (80) to deflect the corresponding servos (82-88) to maintain or modify the flight path. Additional servos may optionally be used to perform other tasks throughout the flight phase such as control surface deployment (90) or backup parachute or landing device deployment (92).

A suite of communication hardware (100) maybe used to transmit data from the mother ship or from a ground operator to obtain the status or impart commands after the package vehicle launch. A video transmitter (102) maybe used to deliver video data from the camera sensor (60) and may be transmitted via a radio modem, analog radio or similar (104). Telemetry data (106) from any of the sensor suites may also be optionally transmitted via the radio modem. Servo Control data may optionally be transmitted or received via the radio control transceiver (108). Such data may be used to send override commands or manually command the package vehicle servos.

Figure 4:
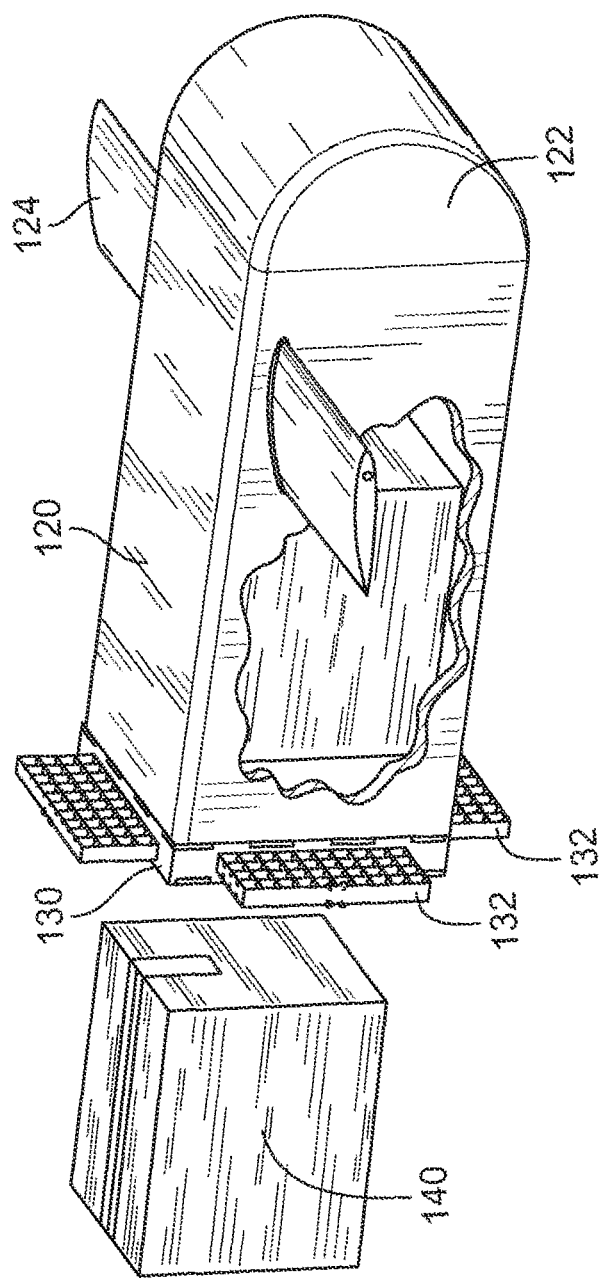
FIG. 4 depicts the package device and its cargo.

Reference is now made to FIG. 4, which is a depiction of one embodiment of a package vehicle (3). In this preferred embodiment, the package vehicle includes a vehicle body (120), a tail kit section (130) and a shipping box (140).

The vehicle body (120) may be made out of Styrofoam, plastic or similar material that can be fabricated at low cost. The vehicle body (120) is designed as a rectangular prism to maintain a high packing efficiency of traditional shipping boxes (140). A nose section (122) may be preferably made out of a material such as Styrofoam that compresses upon impact with the ground to act as a crumple zone and aiding in the suitably soft landing for the shipping box (140) inside. In one embodiment, the nose section (122) may contain an inflatable airbag, which is deployed upon landing in order to further protect the cargo. Wings (124) may be optionally installed or deployed to provide increased lift or modify the aerodynamic performance based upon package weight.

The package is designed such that the aerodynamic properties are known enabling calculation of the trajectory during flying. Compared to a Sail plane or para-wing, in the preferred embodiment the package has a very low lift to drag ratio such that it cannot provide adequate lift to soar long distances or maintain a straight and level flight path. In the preferred embodiment the flight path is straight down, similar to a skydiver, accomplished by using the high drag body and control surfaces to remove all forward airspeed and instead drop vertically at terminal velocity. The purpose of the straight down trajectory is to enable landing in areas with nearby ground obstructions like trees, tall buildings, vehicles or persons, and also to reduce the effects of vertical error in GPS sensors. In the straight down trajectory, a landing is possible as long as the landing site has an unobstructed view of the sky. This is in contrast to sailplanes or parachutes that may have in excess of a 10:1 glide ratio and require a clear approach path. The secondary benefit is that there is no need to accurately measure height above ground level. GPS is known to be inaccurate in the Z-axis, a gliding approach path requires a longer landing site or additional sensors to account for inaccuracies in the height above ground level. As the package is coming straight down guidance only needs to be provided continually in the X and Y axis regardless of altitude above target. This vastly simplifies the navigation requirements and complexity of the control process and increases repeatability of landing operations, as no complex flare control flaps or similar device are needed during a touchdown phase.

Control surfaces (132), depicted as grid fins in this embodiment, may be deflected to modify the attitude of the package and thus alter the flight path. The grid density, pattern and arrangement may be modified to increase drag into an optimal range. In conjunction the aerodynamic drag of the vehicle body (120) and grid fins may be used to maintain a specific terminal velocity range to reduce vertical descent rate during the flight phase. The FCC (70) is mounted in the tail kit (130) of the package vehicle. In this configuration the vehicle body may be made low cost and disposable while the tail kit may be optionally recovered to reduce the cost of repeat package shipments. This allows for the optional recovery and reuse of the tail kit and disposal or recycling of the package body (120).

The package (140) may consist of a standard commercial cardboard shipping box typical of commercial deliveries. The package is inserted into the dash vehicle. The location of the package may be shifted along the length of the vehicle or rotated to improve the location of the Center of gravity relative to the aerodynamic center of lift and thus increase static stability and flight characteristics.

All examples herein are to be construed as being without limitation to such specifically recited examples and conditions. Moreover, all statements herein reciting principles, aspects, and embodiments of the invention, as well as specific examples thereof, are intended to encompass both structural and functional equivalents hereof. Additionally, it is intended that such equivalents include both currently known equivalents as well as equivalents developed in the future, i.e., any elements developed that perform the same function, regardless of structure.

What is claimed is:

1. A tail kit device comprising:
   at least one control surface configured to modify at least one of an attitude or a flight path of one of a delivery vehicle or a payload to which the tail kit device is releasably attached thereto; and
   a flight controller configured to receive location information of a designated landing site, to determine at least one of attitude or flight path adjustment parameters, and to one of maintain or modify the flight path of one of the delivery vehicle or the payload therein to the designated landing site via the at least one control surface,
   wherein the tail kit device is configured to be releasably detached from one of the delivery vehicle or the payload upon completion of the flight path and further configured to be releasably attached to a one of a second payload or a second delivery vehicle.

2. The tail kit device of claim 1, wherein the adjustment parameters cause an actuation of the at least one control surface configured to one of maintain or modify the flight path of the delivery vehicle or the payload.

3. The tail kit device of claim 1, wherein the tail kit device further includes at least one location sensor configured to provide location information to the flight controller.

4. The tail kit device of claim 1, wherein the tail kit device further comprises aerodynamic features wherein:
   the aerodynamic features are configured to be in a non-deployed position when the tail kit device is not in the flight path; and
   the aerodynamic features are configured to be in a deployed position when the tail kit device is in the flight path.

5. The tail kit device of claim 1, wherein the flight controller is configured to be programmed with the location information of the designated landing site.

6. The tail kit device of claim 1, wherein the flight controller is further configured to provide information for communication with one or more sensors on an aerial vehicle.

7. The tail kit device of claim 1, wherein the tail kit device is further configured to land one of the delivery vehicle or the payload at the designated landing site.

8. The tail kit device of claim 1, wherein the tail kit device is further configured to transition to a maneuverable flight form by deploying aerodynamic features under control of the flight controller.

9. The tail kit device of claim 8, wherein the tail kit device is further configured to deploy the aerodynamic features based on one of sensed altitude, air speed or attitude of the tail kit device.

10. The tail kit device of claim 1, wherein the tail kit device further is configured to have a substantially vertical trajectory from a time of release along the flight path to a time of landing.

11. A method for delivering a payload along a flight path to a designated landing site, the method comprising:
releasably attaching a tail kit device to a first payload;
placing location information of a designated landing site into a flight controller of the tail kit device;
releasing the tail kit device attached to the first payload configured to travel along the flight path;
deploying an aerodynamic feature on the tail kit device;
controlling a direction of the tail kit device and the first payload along the flight path to the designated landing site by the flight controller determining flight path adjustment parameters to one of maintain or modify the flight path by controlling at least one control surface on the tail kit device;
uncoupling the tail kit device from the first payload when the tail kit device reaches the end of the flight path; and
releasably attaching the tail kit device to a second payload.

12. The method of claim 11, wherein the tail kit device follows a substantially vertical trajectory from a time of release along the flight path to a time of landing.

13. The method of claim 11, further comprising establishing communications between an aerial vehicle and the tail kit device while the tail kit device is travelling along the flight path.

14. The method of claim 11, wherein the flight path of the tail kit device resembles a vertical flight path of a shuttlecock.

15. The method of claim 11, wherein the releasing the tail kit device further comprises releasing the tail kit device without regard for a height of tail kit device above the designated landing site.

16. The method of claim 11, further comprising orienting the tail kit device into an upward disposed position on the payload during the flight path of the tail kit device along the flight path to the designated landing site.

* * * * *